US008542813B2

(12) United States Patent
Baird (10) Patent No.: US 8,542,813 B2
(45) Date of Patent: Sep. 24, 2013

(54) METHOD AND SYSTEM FOR PROVIDING A CAMP-ON SERVICE IN TELECOMMUNICATIONS

(75) Inventor: Randall B. Baird, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 10/980,093

(22) Filed: Nov. 2, 2004

(65) Prior Publication Data

US 2006/0093116 A1     May 4, 2006

(51) Int. Cl.
*H04M 3/42* (2006.01)

(52) U.S. Cl.
USPC .............................. 379/209.01; 379/210.01

(58) Field of Classification Search
USPC ............. 379/209.01, 210.01, 265.01, 265.14, 379/266.01, 309, 266.08
See application file for complete search history.

(56) References Cited

U.S. PATENT DOCUMENTS

| | | | |
|---|---|---|---|
| 3,963,874 A | 6/1976 | Pommerening et al. | 179/18 |
| 4,809,321 A | 2/1989 | Morganstein et al. | 379/211 |
| 5,668,861 A * | 9/1997 | Watts | 379/215.01 |
| 5,974,131 A * | 10/1999 | Malik | 379/215.01 |
| 6,411,805 B1 * | 6/2002 | Becker et al. | 455/414.1 |
| 6,501,750 B1 | 12/2002 | Shaffer et al. | 370/353 |
| 6,510,162 B1 | 1/2003 | Fijolek et al. | 370/432 |
| 6,546,087 B2 | 4/2003 | Shaffer et al. | 379/90.01 |
| 6,567,505 B1 | 5/2003 | Omori et al. | 379/84 |
| 6,601,099 B1 | 7/2003 | Corneliussen | 709/224 |
| 6,614,899 B1 | 9/2003 | Sollee et al. | 379/218.01 |
| 6,615,236 B2 | 9/2003 | Donovan et al. | 709/203 |
| 6,625,141 B1 | 9/2003 | Glitho et al. | 370/352 |
| 6,636,594 B1 | 10/2003 | Oran | 379/201.01 |
| 6,658,095 B1 | 12/2003 | Yoakum et al. | 379/93.01 |
| 6,661,799 B1 | 12/2003 | Molitor | 370/401 |
| 6,665,723 B2 | 12/2003 | Trossen | 709/227 |
| 6,678,735 B1 | 1/2004 | Orton et al. | 709/230 |
| 6,684,147 B2 | 1/2004 | Park et al. | 701/71 |
| 6,731,625 B1 | 5/2004 | Eastep et al. | 370/352 |
| 6,738,390 B1 | 5/2004 | Xu et al. | 370/467 |
| 6,754,181 B1 | 6/2004 | Elliott et al. | 370/252 |
| 6,760,322 B1 | 7/2004 | Fukuda et al. | 370/352 |
| 6,785,246 B2 | 8/2004 | Foti | 370/261 |
| 6,788,676 B2 | 9/2004 | Partanen et al. | 370/352 |

(Continued)

FOREIGN PATENT DOCUMENTS

| | | |
|---|---|---|
| EP | 0 707 404 A2 | 9/1995 |
| EP | 1 324 581 A1 | 7/2003 |
| JP | 60-068757 | 4/1985 |
| WO | WO 01/15419 A1 | 3/2001 |

OTHER PUBLICATIONS

Correspondence issued Nov. 6, 2009 from The Patent Office of the People's Republic of China regarding counterpart Application No. 200580031222.9 (7 pages), Nov. 6, 2009.

(Continued)

*Primary Examiner* — William Deane, Jr.
(74) *Attorney, Agent, or Firm* — Baker Botts L.L.P.

(57) ABSTRACT

According to one embodiment of the invention a method for facilitating communication includes receiving an indication that a caller desires to camp-on a telephone associated with a campee and in response to the indication assigning the caller to a camper queue that stores a prioritized list of a plurality of campers camping on the telephone associated with the campee.

44 Claims, 7 Drawing Sheets

(56) References Cited

U.S. PATENT DOCUMENTS

| | | | |
|---|---|---|---|
| 6,865,540 B1* | 3/2005 | Faber et al. | 705/8 |
| 6,970,547 B2* | 11/2005 | Andrews et al. | 379/210.01 |
| 7,068,775 B1 | 6/2006 | Lee | 379/265.02 |
| 7,076,043 B2* | 7/2006 | Curbow et al. | 379/201.06 |
| 7,224,791 B2 | 5/2007 | Haukilahti | 379/266.01 |
| 7,492,887 B1* | 2/2009 | Stumer et al. | 379/265.01 |
| 2002/0078150 A1* | 6/2002 | Thompson et al. | 709/204 |
| 2003/0035531 A1 | 2/2003 | Brown et al. | 379/265.01 |
| 2004/0062383 A1* | 4/2004 | Sylvain | 379/265.06 |
| 2005/0027867 A1* | 2/2005 | Mueller et al. | 709/227 |
| 2005/0207560 A1* | 9/2005 | Speight | |
| 2006/0146987 A1 | 7/2006 | Haukilahti | 379/67.1 |

OTHER PUBLICATIONS

The Third Office Action issued by the State Intellectual Property Office of the People's Republic of China; Application No. 200580031222.9; Serial No. 2010092600316640, Sep. 29, 2010.

European Search Report regarding PCT/US2005038920 (Application No. 05823435.2-2414/1808003) dated Jul. 27, 2010.

3GPP TR 24.841 Vo. 1.0 (Sep. 2002) "3rd Generation Partnership Project; Technical Specification Group Core Network; Presence Based on SIP; Functional Models, Flows and Protocol Details (Release 6)", Sep. 1, 2002.

Government of India, Patent Office, first Examination Report, Application No. 2709/DELNP/2007; 1 page, Feb. 21, 2013.

EPO, Communication pursuant to Article 94(3), Application No. 05 823 435.2-1858, Ref. P30027EP-PCT, 5 pages, Mar. 11, 2013.

ETSI, European Telecommunication Standard, "Private Telecommunication Network (PTN); Inter-exchange signalling protocol Call completion supplementary services," ETS 300 366, Reference: DE/ECMA-00049, Source: ETSI TC-ECMA, ICS: 33.080, 70 pages, Jul. 1994.

Office Action (PCT application in Chinese national phase) Filing No. 200580031222.9 received on Jun. 25, 2009 from foreign associate (12 pages including Chinese translation of document).

* cited by examiner

METHOD AND SYSTEM FOR PROVIDING A CAMP-ON SERVICE IN TELECOMMUNICATIONS

TECHNICAL FIELD OF THE INVENTION

This invention relates generally to telecommunication systems and, more particularly to a method and system for providing a camp feature in telecommunications.

BACKGROUND OF THE INVENTION

Telecommunications is becoming increasingly important in today's society. One problem often encountered by a caller is being unable to reach a callee because the callee's phone is busy. One approach at addressing this problem is the camp feature offered in some telephone systems. A camp feature allows a caller to complete calls when they fail because the callee is busy. According to one approach, if the callee is busy the caller invokes a camp-on feature. The callee is automatically rung when the callee hangs up from the previous call. In a TDM-based system, the camp-on feature is often implemented at the switch.

SUMMARY OF THE INVENTION

According to one embodiment of the invention a method for facilitating communication includes receiving an indication that a caller desires to camp-on a telephone associated with a campee and in response to the indication assigning the caller to a camper queue that stores a prioritized list of a plurality of campers camping on the telephone associated with the campee.

Embodiments of the invention may provide numerous technical advantages. Some embodiments may benefit from some, none, or all of these advantages. For example, according to one embodiment of the invention the problem associated with which camper is granted access to a campee when the campee becomes available is solved by creating a prioritized list. In addition, in one embodiment such a prioritized list may be managed by the campee so that the campee may select who may be granted access to his telephone. A further technical advantage involves problems associated with campers who are no longer available. For example, by only placing the call between the camper and the campee when the camper has an "open" status, canceling of the camp can be avoided. Further, by including a time out feature associated with a camper who does not answer the phone, incessant ringing of a particular camper can be avoided.

Other advantages may be readily apparent to one of skill in the art.

BRIEF DESCRIPTION OF THE FIGURES

Reference is now made to the following description taken in conjunction with the accompanying drawings, wherein like reference numbers represent like parts, in which.

DETAILED DESCRIPTION OF THE INVENTION

Embodiments of the invention are best understood by referring to FIGS. 1 through 4C of the drawings, like numerals being used for like and corresponding parts of the various drawings.

Figure 1:
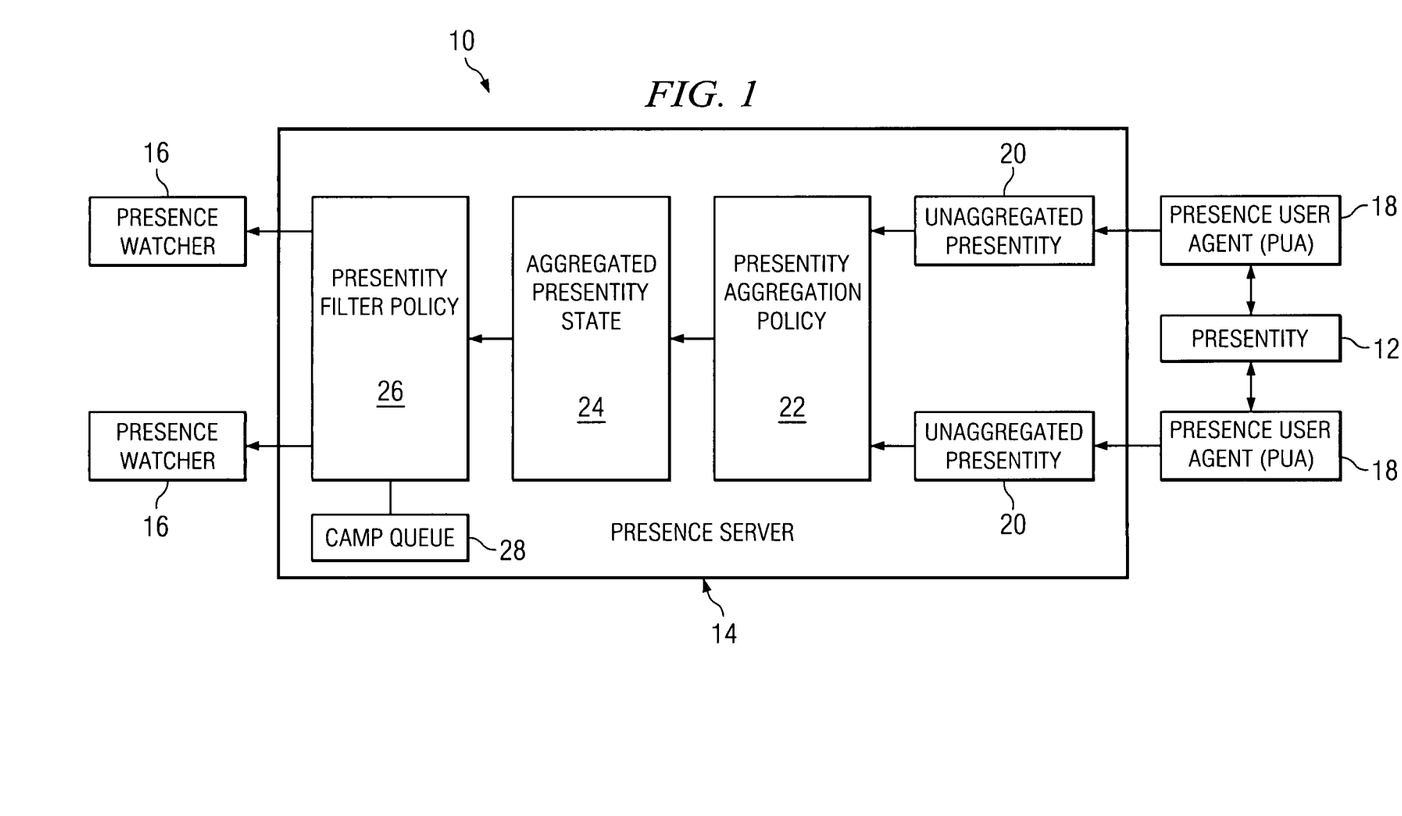
FIG. 1 is a block diagram illustrating a presence server in conjunction with a plurality of presence user agents and presence watchers according to the teachings of one embodiment of the invention.

FIG. 1 is a block diagram of a system 10 for use in providing camp functionality through a plurality of campees. System 10 includes a presentity 12, a presence server 14, and a plurality of presence watchers 16. Presentity 12 represents a particular party with whom communication is desired, such as a called party or callee. Presence server 14 is a single computer or group of computers that is capable of receiving presence information regarding one or more presentities 12 and selectively provide that information to presence watchers 16. Examples of presence servers include presence servers as defined by IETF specifications. Presence watchers 16 represent entities that wish to obtain presence information about one or more presentities 12. Presence information may include information about whether presentity 12 is on the phone, whether presentity 12 is logged onto a computer, whether presentity 12 is in a particular location, or other types of information generally regarding the availability, location, or activity in which presentity is engaged.

A plurality of presence user agents (PUA) 18 are also illustrated. Presence user agents 18 obtain particular information about an aspect of the presence of presentity 12. One example of a presence user agent 18 is software or hardware embodied in a telecommunications switch that determines the hook status of a telephone associated with presentity 12. Another example of a presence user agent is software that monitors whether a computer associated with the presentity 12 is logged onto. A third example of presence user agent is a device that communicates with an ID tag worn by presentity 12 to indicate the location of presentity 12. Yet another example of a presence user agent is an IP phone. Although particular presence user agents are described, a variety of presence user agents may be utilized according to the teachings of the invention included those yet to be developed. Presence user agents 18 determine a presence status of presentity 12 and provide status to presence server 14.

Unaggregated presentity block 20 of presence server 14 receives one or more indications of the presence of presentity 12 from one or more presence user agents 18. This information is aggregated according to a presentity aggregation policy by presentity aggregation policy block 22. One example of such a policy is that if all presentity statuses are green (or "open") then the aggregated presence of the presentity is green, but if any of the presentity statuses are red (or "closed") then the presence of presentity 12 is red.

Presentity aggregation policy block 22 outputs the aggregated presentity state to aggregated presentity state block 24. Aggregated presentity state block 24 provides this aggregated presentity state to a presentity filter policy block 26.

As described in greater detail below, presentity filter policy 26 may implement policies to selectively provide the presentity state of presentity 12 to one or more presence watchers 16 such that the state may differ depending on the identity of presence watcher 16. In implementing this function, a camper queue 28 may be utilized to determine the order in which the presentity status of presentity 12 is provided to any particular presence watcher 16.

The teachings of the invention recognize some limitations on traditional camp-on services. For example, the inability to determine whether the camper, also referred to here as the caller, is available when the callee becomes free is problematic. This can result in the camp feature either being canceled, or in the camper's phone ringing incessantly. In addition, it is difficult to camp-on callees that do not answer their phone, rather than the phone merely being busy. Furthermore, the inability of the callee to manage the list of campers is less than desirable. In addition, it is believed that traditional systems do not adequately address multiple campers camping on a single campee.

According to the teachings of the invention, the above-identified limitations on traditional camp-on service are addressed, in some embodiments of the invention. For example, the presence state of the callee can be used to extend the camp function to no-answer cases. Further, the presence state of the camper can be used to avoid the camper's phone when the camper is no longer present. The campee can examine the state of various campers and manage the order in which they receive access or deny access to undesirable campers. According to one embodiment of the invention, a camper queue is maintained that stores a plurality of campers in a prioritized list. Thus, the particular camper of a plurality of campers that are camping on the same campee that is granted access first to the campee when he becomes available can be specified. In one example, the particular person that is granted access first is the first camper to camp on the campee. Thus, campers are treated on a first-in first-out basis. However, other priority determinations may be utilized, including prioritization that is based upon the campee's input, as well as prioritization that is based on other predetermined rules, such as the identity of the camper.

In particular, according to one embodiment of the invention, a "camp-on queue" filter policy is implemented in a presentity filter policy block 26 in presence server 14 or specified campee presentities 12. According to this filter embodiment, only one queue element at a time can be notified that the campee (presentity 12) is open. This prevents all campers from jumping on the campee simultaneously when the campee becomes available. Campers utilizing presence watchers 16 make requests to be added or removed from the camp queue 28. This can be done through any suitable protocol or can be done by watching a special "camp-on" presentity associated with each campee. Campers in the queue have a fixed amount of time to complete a call to the campee. If they fail to complete the call they are temporarily disabled, assuming the camper is unavailable. The temporarily disabled camper will be re-enabled later in an attempt to complete the call. Campers can also be disabled if their own presentity shows that they are closed; in other words, campers may be disabled when they are unavailable.

In one embodiment, campers have priority over normal, non-camp watchers. While there are active campers, normal watchers always see the campee as "closed", or in other words busy. When all campers are disabled, or when there are no campers, non-camped watchers receive open presence information about the campee. In addition, according to one embodiment, campees can query the current state of the camper queue 28 and can re-order the priority of campers in that queue.

Figure 2A:
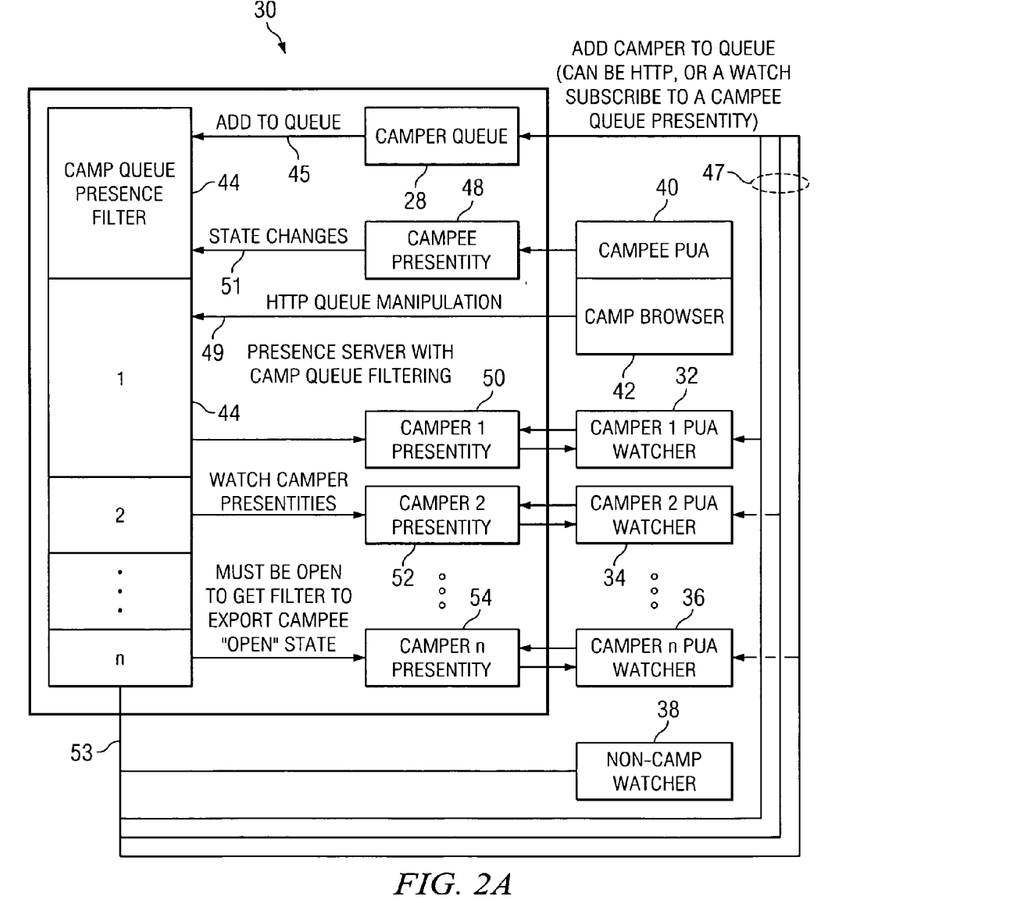
FIG. 2A is a block diagram of one example of the presence server of FIG. 1 according to the teachings of the invention.

FIG. 2A is one example of portion 30 of presence server 10 according to the teachings of the invention. In this example portion 30 receives presentity status information regarding a plurality of campers from camper presence user agent watchers 32, 34, and 36. In addition, portion 30 receives presentity state information from campee presence user agent 40. The camp browser 42 communicates with a camp queue presence filter 44 stored in portion 30, allowing the campee to view and manipulate the camp queue presence filter 44. Campee presentity block 48 aggregates the presentity status information received from campee presence user agent 40 and similar presence user agents (if more than one presence user agent is utilized). The aggregated state of campee presentity is provided to camp queue presence filter 44. Camper queue 28 is the queue of campers camping on the campee. Campers may be added to the camper queue 28 by request from camper presence user agents 32, 34, and 36. Any suitable form of request may be utilized, such as an HTTP communication or the request may be implicit based on the camper subscribing to the status of the campee.

A plurality of camper presentity blocks 50, 52, and 54 are included within portion 30, in this embodiment. Each camper presentity block stores an aggregated presentity status for the corresponding camper presence user agent watcher. Thus, the presentity status of a particular camper is utilized by camp queue presence filter in determining the presentity status of the campee that is provided to the corresponding camper presence user agent watcher. In addition, a non-camp watcher 38 receives presence status from camp queue presence filter 44.

In operation, a party wishing to camp-on the campee provides such a request from an associated camper presence user agent watcher to camper queue 28 over one of lines 47. Suitable protocols for doing this include an HTTP exchange and a simple presence "watch" subscription. Campee queue block 46 adds the camper corresponding to the request to the camp queue presence filter over line 45. Camp queue presence filter 44 maintains, in one embodiment, a first-in first-out priority list corresponding to each camper requesting to camp-on the campee. This list may be manipulated by the campee, according to one embodiment, over line 49, in which, in this example, the campee may manipulate the camp queue presence filter the order of campers in the camp queue presence filter by camp browser 42. The presentity status of the campee, stored by campee presentity block 48, is provided to camp queue presence filter 44 over line 51.

When the campee becomes available, an "open" or available status is provided to the camper that has first priority in the camper queue. However, according to one embodiment, for this to occur not only must the camper be first in the queue but the camper must also have an "open" or available status. In other words, the camper will not be provided an "open" status for the campee if the camper is not also "open." For all other campers in the queue, when the campee presentity status becomes "open" for the first camper in the queue, the others will receive a "closed" status for the campee. It should be noted that the invention contemplates the use of rich forms of presence status, in addition to the open/closed presence status described above. The campee status for each of campers that is received for each of the campers is provided over lines 53 to the corresponding presence user agent watcher, including non-camped watcher 38. Only when camp queue presence filter is empty are non-camp watchers provided an "open" status for the campee. Thus, when a plurality of campers are camping on a particular campee, the first camper to enter the queue is granted access to the campee when the campee becomes available and when the camper is also available. When this occurs, the camper is automatically rung as is the campee to complete the call. Thus, according to the teachings of the invention, the order in which campers are granted access to a campee is determined by a presence filter, which can utilize a first-in first-out filter, or may be otherwise prioritized, including receiving input from a campee.

It is noted that a presence server 10, having a prioritized camper queue 28 and an associated filter, responds to and cooperates with some general behavior from the camper watcher 32, 34, 36. The watcher 32, 34, 36 indicates its intention to camp by placing itself on camper queue 28, either by requesting it be enqueued via HTTP and then subscribing to watch the campee's presentity, or merely by subscribing. When the watcher 32, 34, 36 sees the campee's presentity go "open", it attempts to notify the user that it is possible to place the call. If the user responds, the watcher 32, 34, 36 then places the call, stops subscribing to the campee's presentity, and in some cases requests that it be removed from the camper queue 28. This procedure removes the camper from the queue server once he attempts to make the call.

If the call fails, the watcher 32, 34, 36 can re-enqueue itself on the camper queue 28. In some embodiments, functionality may be provided in filter 44 or other suitable location to a mechanism to indicate that the camper failed to connect the call and insert the camper in a location somewhere other than at the end of the camper queue 28.

In the embodiment of FIG. 2A, presence server 30 is a customized presence server that includes both a camp queue presence filter and camper presentity blocks. However, in some embodiments it will be desirable to utilize customary presence servers, with the camp queue presence filter functions performed on a separate device, thus not requiring modification of the presence server itself.

Figure 2B:
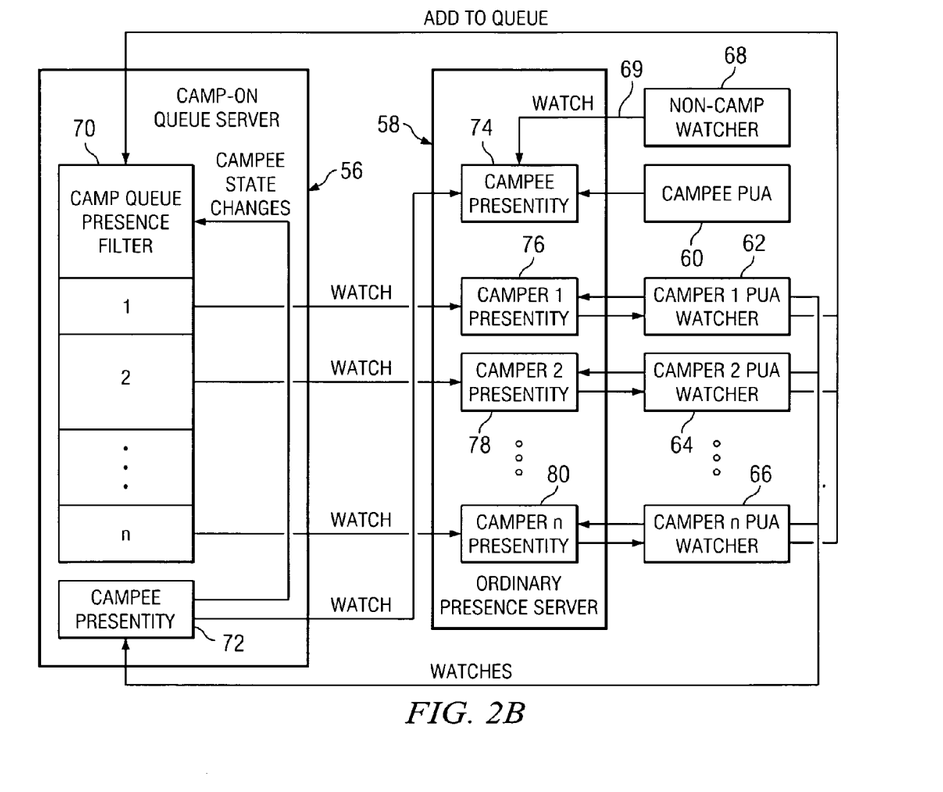
FIG. 2B is a second example of the presence server of FIG. 1 according to the teachings of the invention.

FIG. 2B illustrates a camp-on queue server 56, an ordinary presence server 58, a campee presence user agent 60, a plurality of camper presence user agents and watchers 62, 64, and 66, and a non-camp watchers 68. The operation of the system of FIG. 2B is similar to the operations systems of FIG. 2A, except that ordinary presence server 58 operates generally as it normally would absent the camp-on queue server. In this example, camp-on queue server 56 includes camp queue presence filter 70 and campee presentity block 72. Campee presentity block 72 is cascaded, meaning that it has a different output for each camper presence user agent and watcher 62, 64, and 66. As an ordinary presence server, presence server 58 maintains a presentity status for each of the campee and the various campers through presentity blocks 74, 76, 78 and 80.

In operation, when the campee becomes available, an indication that the campee status is open is provided to campee presentity block 74. The presentity status of the campee is watched by campee presentity block 72 in camp-on queue server 56. Upon seeing an open status stored by campee presentity block 72, camp queue presence filter determines which camper is first in the queue and confirms that this camper currently has an "open" status. Camp queue presence filter 70 communicates with campee presentity status 72 to output a "open" presentity status to the first camper in the queue that also has an "open" status. A "closed" status is provided to all other campers.

In one embodiment, a non-camped watcher may have direct access to the campee presentity status through customary presence server 58, as indicated by line 69. Thus, in such a case, non-camp watchers are provided access to the open campee in some cases where camped watchers are not.

In either embodiment of FIG. 2A or 2B, once the camper is provided an "open" status, a call may take place between the camper and the campee as described in greater detail below in conjunction with FIG. 4. A particular structure utilized to implement the above described procedures for allowing access to a campee by a plurality of campers may vary. For example, in one approach, different filters may be used for watchers that are campers and watchers that are not campers.

Thus, a presence server could be utilized that uses a camper queue in addition to an instant message filter that both selectively access the state of a particular presentity. In one example, the instant message filter may always provide the appropriate status of the appropriate presentity state of the presentity while the camper queue filter only provides "open" state to the camper first in the queue. Thus, in this example, a camp watcher and an instant message watcher may subscribe to two different addresses corresponding to the particular filters within the present presence server. In another embodiment, the same presentity filter may be utilized in a presence server that is accessed both by camp watchers as well as non-camp watchers such as instant message watchers. These different types of watchers may be differentiated through a different message sent to the filter, such as a different HTTP message. In one example, an HTTP message may identify a request specific to campers while another message may identify a request specific to an instant message watcher. In a third embodiment, similar to the approach of FIG. 2B, an ordinary presence server is utilized that allows direct access to non-camp watcher to the presentity state of a particular presentity while campers must through an additional camp queue presence server coupled to the ordinary presence server. This approach facilitates implementation of the above described camp queue policies without modification of existing presence servers.

Figure 3:
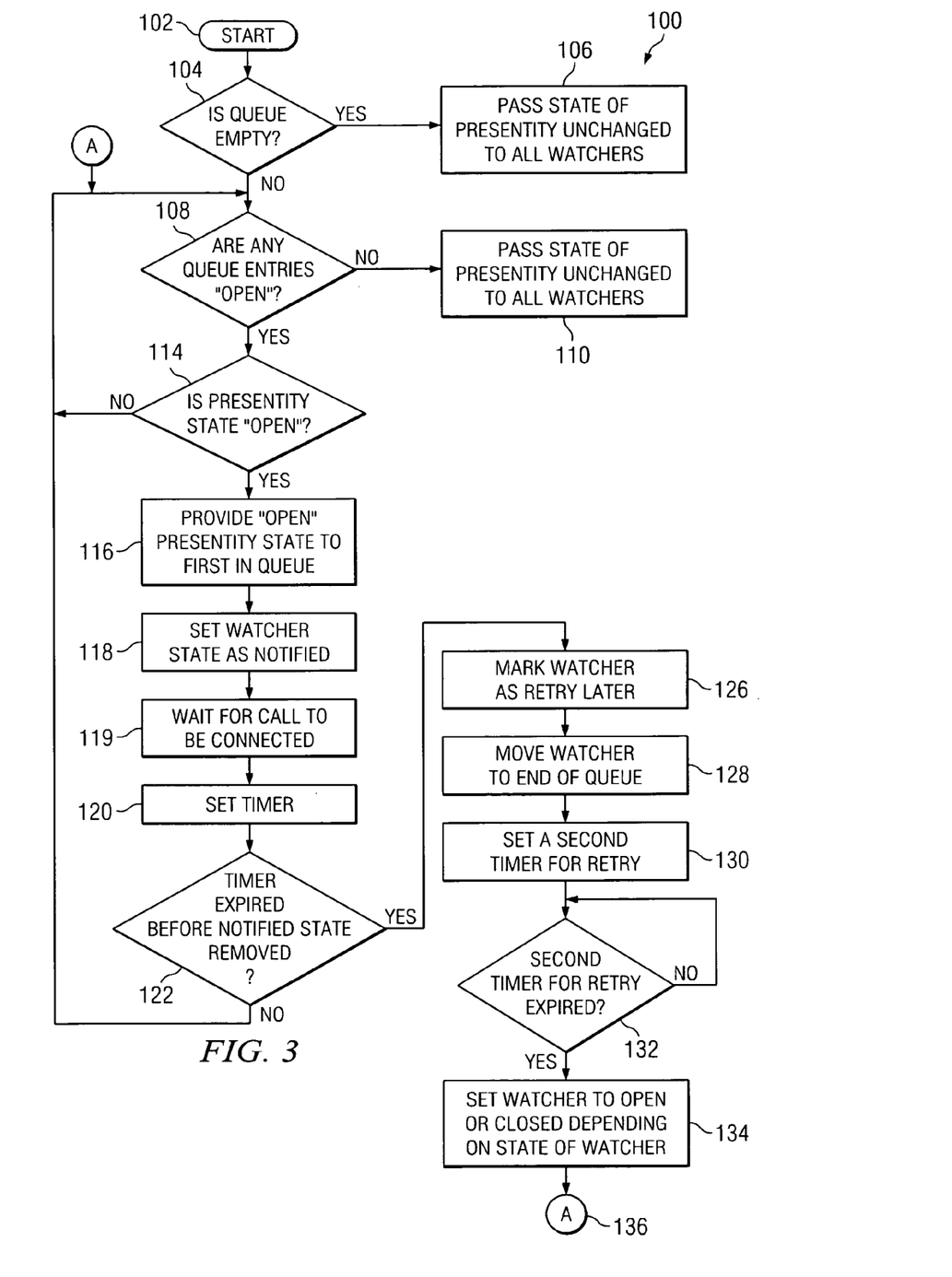
FIG. 3 is a flow chart illustrating operation of the presence server of FIG. 1 according to the teachings of the invention.

FIG. 3 is a flow chart illustrating acts associated with the camp queue presence filter of the FIGS. 1, 2A, and 2B in addressing prioritization of a plurality of campers camping on a common campee. It is noted that a sequential flow chart is provided to better describe various acts that may be performed, but should not be understood to imply the underlying process may not be event driven. An example call forwarding process is described in FIGS. 4A and 4B. The method begins at step 102. At step 104 a determination is made of whether the associated camper queue is empty. If the queue is empty then the state of the presentity is passed to all watchers at step 106. However, if the queue is not empty then an enquiry is made at step 108 of whether there are any camper queue entries that are "open". If there are no camper queue entries that are open then the state of the presentity of the campee is passed unchanged to watchers that are not in the queue, as indicated by block 110. However, if there are no campers in the queue who are open, then it is determined whether the presentity state is "open" at step 114. If the presentity state is not open, then processing would restart at step 108 at the appropriate time. However, if the presentity state is open, then an "open" presentity state is provided to the first camper in the queue at step 116.

At step 118 a watcher state is set as notified. The watcher state specifies whether a particular watcher has been notified of an "open" state. The state may be stored in presence server 14 and in particular embodiments may be stored on presentity filter policy block 26 then camp queue presence filter 44; however, it may be stored in other locations. The process continues at step 119 in which waiting for the call to be connected occurs. At step 120 a timer is set, pending notification that the watcher has removed itself from the queue, indicating that the call was connected. At step 122 a determination is made of whether the timer expired before the notified state is removed. It should be noted that the queue element will be removed at the request of the watcher's machine, as described in the example of FIGS. 4A and 4B. If the timer has not expired then the call was connected by the client. However, if the timer did expire, indicating that the caller associated with the watcher has not answered his phone (although his presentity status may still be "open"), the caller associated with that watcher is marked as retry later at step 126.

At step 128 the caller associated with the particular watcher is moved to the end of the queue and a second timer is set for a retry at step 130. At step 132 a determination is made of whether the second timer for retry expired. This step is continued until the timer has expired. At step 134 the caller associated with the watcher is set to "open" or "closed" depending on the state of the watcher. It is noted that it may be undesirable for a camper to remain in the camp queue indefinitely, such as may occur if a camper goes on vacation. To avoid this, the camper may be removed from the camper queue after some number of timer expirations where the camper failed to attempt the call. Such an approach may be implemented by presence filter 44, and may also involve suitable programming associated with the camper's phone. The method concludes at step 136.

Figure 4A:
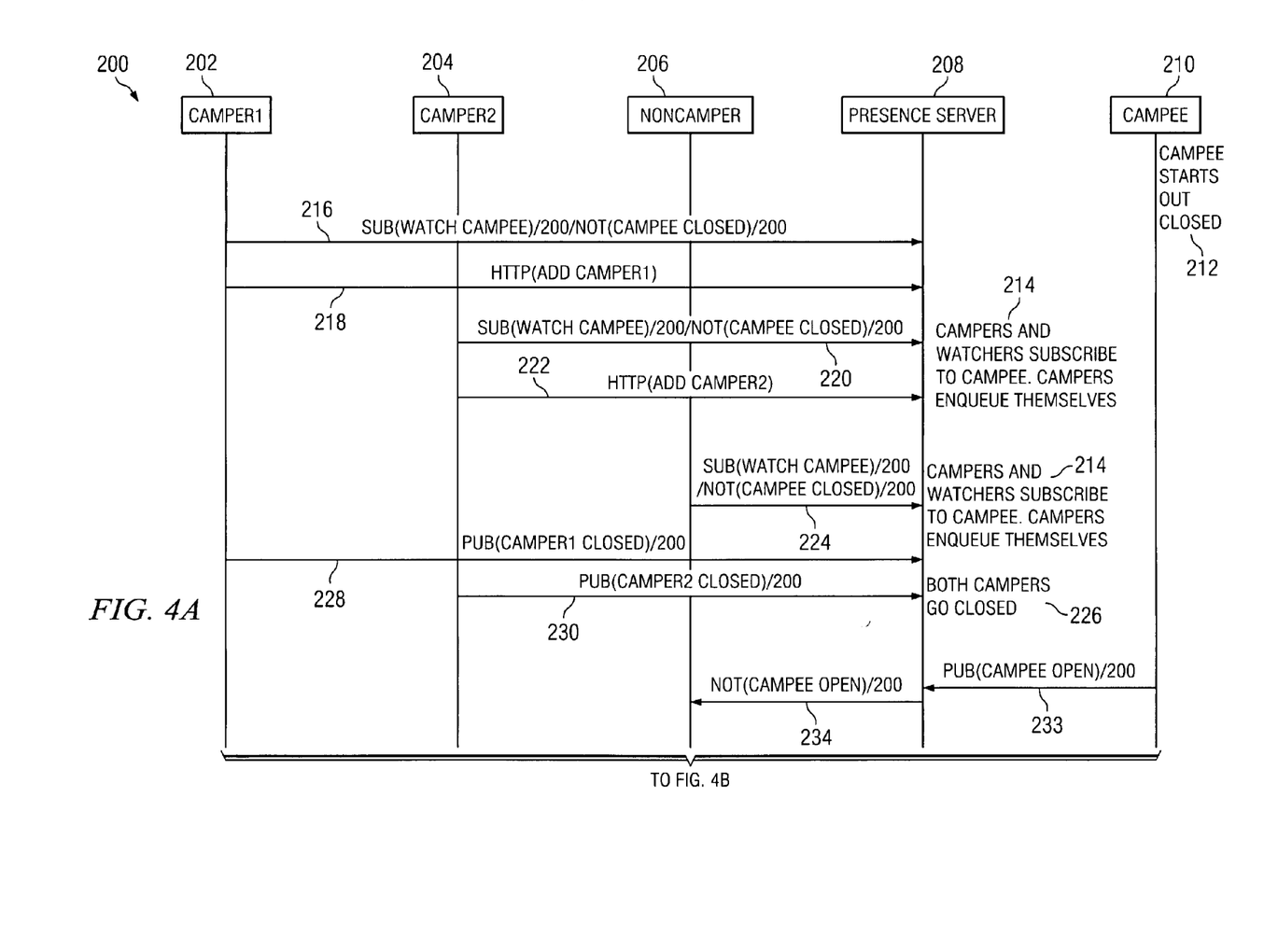
FIGS. 4A through 4C are charts illustrating operation of the system of FIG. 1 according to the teachings of the invention.
Figure 4B:
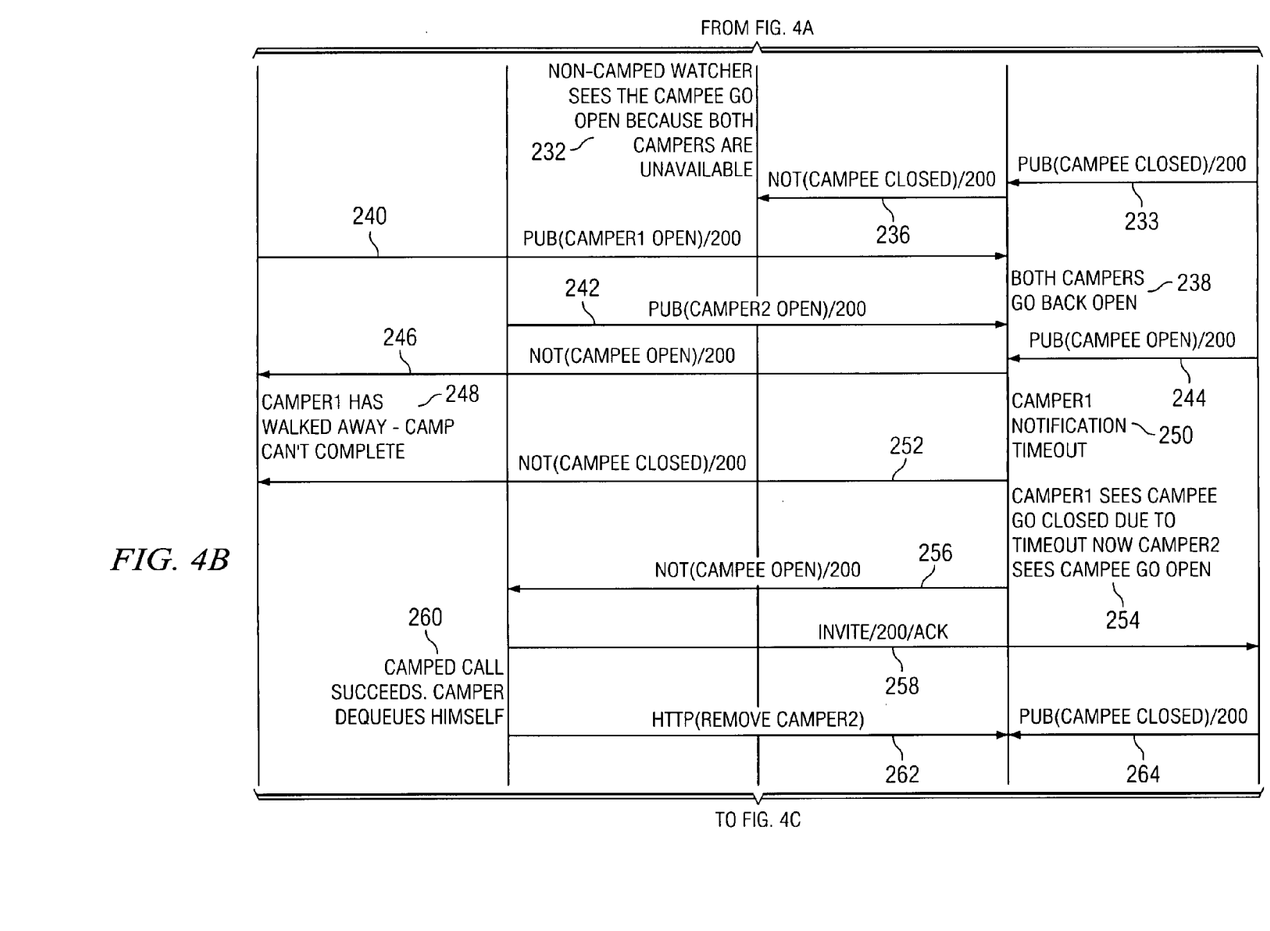
Figure 4C:
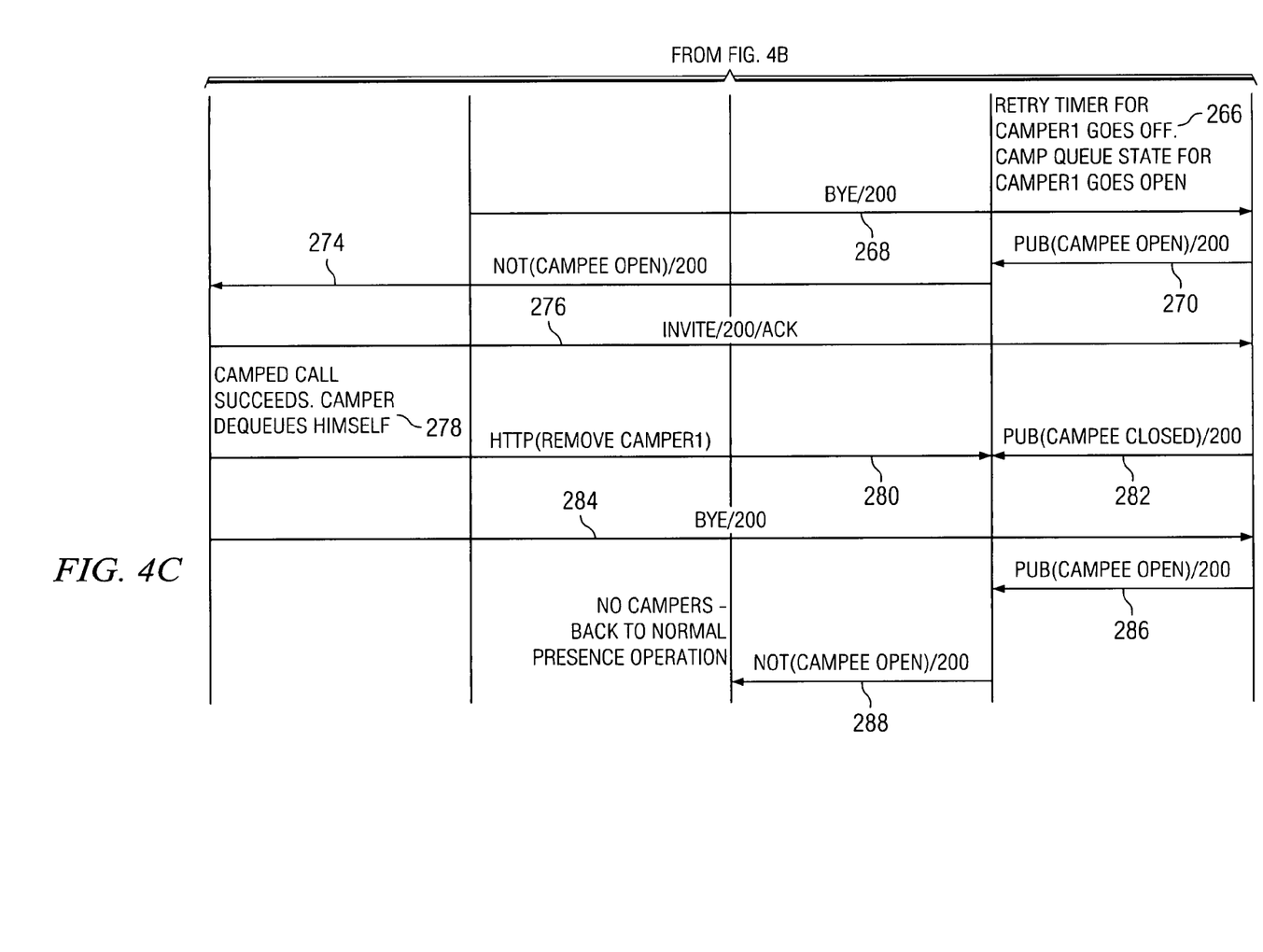

FIGS. 4A, 4B, and 4C are charts illustrating various actions that may occur according to one embodiment of the invention in an example in which two campers wish to camp on the same campee. In this chart, the vertical lines correspond to actions taken by camper 202, camper 204, non-camper 206, presence server 208 having a queue filter implemented, and campee 210. A non-camper, such as non-camper 206 may be an instant message client, for example. The below example is a SIP/SIMPLE example. Abbreviations utilized in FIG. 4 include "SUB" which stands for SIP SUBSCRIBE request. The "/200", etc. notations are SIP response codes that flow back in the opposite direction of the arrow. "PUB" is a SIP PUBLISH request, and "NOT" is a SIP NOTIFY request.

Block 212 indicates that a campee starts out with a presentity status of closed. Block 214 indicates a series of actions involving camper 1 and camper 2 watching the campee and placing themselves in the camper queue. Specifically, at step 216 camper 1 sends a command to the presence server to watch the campee. At step 218, the camper 202 expresses a desire to add itself to the camper queue by an HTTP command. In this example, corresponding actions are taken by camper 204 at steps 210, 220, and 222. In addition, non-camper 206 initiates watching of campee 210 at step 224.

Block 226 indicates actions causing campers 202 and 204 to go closed, meaning that neither camper is available to conduct a call with campee 212. This is effected in this example by step 228 for camper 202 and step 230 for camper 204. As shown on FIG. 4B, block 232 indicates that the non-camped watcher 206 sees campee 210 go "open" because both campers are unavailable, as indicated by blocks 234 and 236. This is in response to the campee publishing a campee "open" presentity status at step 233. At step 240 and step 242 both campers go back "open" as indicated by block 238.

After the campee publishes an "open" status at step 244, camper 202, which is first in the queue, is notified of the "open" status of campee 210. According to this example, the camper 202 has walked away and the camped call cannot be completed as indicated at block 248. The presence server detects this at step 250 because camper 202 notification has timed out. In response, the presence server notifies camper 202 that the campee is closed because camper 202 has timed out as indicated by block 252. In addition, camper 204 is notified that the campee is open because camper 204 is next in the queue, as indicated at blocks 254 and 256.

At step 260, the camped call succeeds. In addition, camper 204 provides a signal de-queueing himself from the camped queue. This may be sent by the associated watcher, or through other suitable device. In this example, the queue command is an HTTP command sent to presence server 208. At step 264, the campee's status of "closed" is published to all campers, because the campee answered camper 204's call. At step 266 a retry timer for camper 202 expires and the camped queue state for camper 202 goes "open".

Continuing with the example, the call with camper 204 is concluded, as indicated by block 268, resulting in campee publishing to the presence server an "open" status which is in turn notified to camper 202 at step 274. In response, camper 202 places the call to campee 210, as indicated by block 276. Following successfully making the call, camper 202 dequeues himself from the camper queue as indicated by block 278 by sending an HTTP command, in this example, at step 280 to presence server 208. In response to the completion of the call, campee 210 publishes to presence server 208 a "closed" status at step 282. Continuing with the example, the call between campee 210 and camper 202 is completed, as indicated by block 284, resulting in the campee publishing its presentity status at step 286 to present server 208 and notification at step 288 to the non-camper 206 of the open status for campee 210. This notification is made because no campers remain in the queue and thus all non-camped entities granted access to the presentity status of campee 210.

Although the present invention and its advantages have been described in detail, it should be understood that various changes, substitutions, and alterations can be made therein without departing from the spirit and scope of the invention as defined by the appended claims.

What is claimed is:

1. A method for facilitating communication comprising:
   receiving an indication that a caller desires to camp on a telephone associated with a campee;
   in response to the indication, assigning the caller to a camper queue storing a prioritized list of a plurality of callers camping on the telephone associated with the campee;
   providing the prioritized list to the campee to allow the campee to set the order of the plurality of callers camping on the telephone associated with the campee;
   receiving information from the campee indicative of an order of the prioritized list;
   setting the order of the prioritized list in response to information provided by the campee;
   monitoring the apparent availability of the campee to receive a call by receiving the apparent availability from at least one presence user agent associated with the campee;
   monitoring the apparent availability of the caller to participate in a call by receiving the apparent availability from at least one presence user agent associated with the caller; and
   in response to an indication that the campee appears available to receive a call and to attainment by the caller of the highest priority in the prioritized list, automatically providing an indication to the caller that the campee appears available to receive the call only if the caller appears available and if, based on information received from a presence user agent, the caller appears unavailable, moving the caller to a new location in the prioritized list.

2. The method of claim 1, wherein setting the order of the prioritized list comprises setting the order before providing the prioritized list to the campee.

3. The method of claim 1, wherein setting the order of the prioritized list comprises setting the order after providing the prioritized list to the campee.

4. The method of claim 1, further comprising in response to a caller not accepting an indication that the campee appears available to receive a call, automatically making the camper appear unavailable to receive a call.

5. The method of claim 4, wherein in response to a caller not accepting an indication that the campee appears available to receive a call comprises in response to a caller not accepting an indication, within a predetermined amount of time, that the campee appears available to receive a call.

6. The method of claim 1, wherein in response to an indication that the campee appears available to receive a call and to an indication that each of the callers on the prioritized list are unavailable, indicating to a non-camped watcher that the campee is available.

7. A method for facilitating communication comprising:
receiving an indication that a caller desires to camp on a telephone associated with a campee;
in response to the indication, assigning the caller to a camper queue that stores a prioritized list of a plurality of callers camping on the telephone associated with the campee;
providing the campee access to the prioritized list to allow the campee to set the order of the plurality of callers camping on the telephone associated with the campee;
receiving information from the campee indicative of an order of the prioritized list;
setting the order of the prioritized list in response to information provided by the campee;
monitoring the apparent availability of the campee to receive a call by receiving the apparent availability from at least one presence user agent associated with the campee;
monitoring the apparent availability of the caller to participate in a call by receiving the apparent availability from at least one presence user agent associated with the caller; and
automatically providing an indication to the caller that the campee appears available to receive a call only when the caller attains the highest priority in the prioritized list and both the campee and the caller appear available and if, based on information received from a presence user agent, the caller appears unavailable, moving the caller to a new location in the prioritized list.

8. The method of claim 7, wherein the prioritized list is a first-in, first-out list.

9. The method of claim 7, and further comprising prioritizing the prioritized list in response to information provided by the campee.

10. The method of claim 7, and further comprising prioritizing the prioritized list in response to the identity of the camper.

11. The method of claim 7, and further comprising monitoring by a presence server the availability of the campee to receive a call.

12. The method of claim 7, and further comprising monitoring by a presence server the availability of the plurality of campers to receive a call.

13. The method of claim 7, further comprising in response to a caller not accepting an indication that the campee appears available to receive a call, automatically making the campee appear unavailable to receive a call.

14. The method of claim 13, wherein in response to a caller not accepting an indication that the campee appears available to receive a call comprises in response to a caller not accepting an indication, within a predetermined amount of time, that the campee appears available to receive a call.

15. A system for facilitating communication comprising:
a presence server operable to receive at least one indication associated with respective ones of at least one campee that is indicative of the availability of the campee;
a memory storing at least one prioritized list of a plurality of campers camping on the campee;
a connection between the prioritized list and the campee allowing the campee to access and set the order of the prioritized list of the plurality of campers camping on the campee;
at least one presence user agent operable to generate at least one indication of the availability of at least one of the campers; and
wherein the memory is operable to store an update to the prioritized list, the update comprising moving a camper to a new location in the prioritized list when the campee is available and the presence server determines, based on information received from a presence user agent, that the camper having the highest priority is unavailable to receive a call.

16. The system of claim 15, and further comprising a filter operable to prioritize the prioritized list.

17. The system of claim 16, wherein the filter and the prioritized list are stored on the presence server.

18. The system of claim 16, wherein the filter is further operable to prioritize the prioritized list in a first in, first out manner.

19. The system of claim 16, wherein the filter is further operable to prioritize the prioritized list in response to information provided by the campee.

20. The system of claim 16, wherein the filter is further operable to prioritize the prioritized list in response to the identity of the camper.

21. The system of claim 16, wherein the filter and the prioritized list are stored off the presence server.

22. The system of claim 15, and further comprising a presence user agent operable to generate the at least one indication of the availability of the campee.

23. A computer program stored on a non-transitory computer-readable medium, the computer program operable, when executed on a processor, to:
receive an indication that a caller desires to camp on a communication device associated with a campee;
in response to the indication assign the caller to a camper queue that stores a prioritized list of a plurality of callers camping on the telephone associated with the campee;
provide the campee access to the prioritized list to allow the campee to set the order of the plurality of callers camping on the telephone associated with the campee;
receive information from the campee indicative of an order of the prioritized list;
monitor the apparent availability of the campee to receive a call by receiving the apparent availability from at least one presence user agent associated with the campee;
monitoring the apparent availability of the caller to participate in a call by receiving the apparent availability from at least one presence user agent associated with the caller; and
provide an indication to the caller that the campee appears available to receive a call only when the caller attains the highest priority in the prioritized list and both the campee and the caller appear available and if, based on information received from a presence user agent, the caller appears unavailable, move the caller to a new location in the prioritized list.

24. The computer program of claim 23, wherein the prioritized list is at first in, first out list.

25. The computer program of claim 23, wherein the computer program is further operable to prioritize the prioritized list in response to information provided by the campee.

26. The computer program of claim 23, wherein the computer program is further operable to prioritize the prioritized list in response to the identity of the camper.

27. The computer program of claim 23, wherein the computer program is further operable to monitor the availability of the campee to receive a call.

28. The computer program of claim 23, wherein the computer program is further operable to monitor the availability of the plurality of campers to place a call.

29. The computer program of claim 23, further comprising in response to a caller not accepting an indication that the campee appears available to receive a call, automatically make the campee appear unavailable to receive a call.

30. The computer program of claim 29, wherein in response to a caller not accepting an indication that the campee appears available to receive a call comprises in response to a caller not accepting an indication, within a predetermined amount of time, that the campee appears available to receive a call.

31. A computer program stored on a non-transitor computer-readable medium, the computer program operable, when executed on a processor, to:
receive an indication that a caller desires to camp on a telephone associated with a campee;
in response to the indication, assign the caller to a camper queue that stores a prioritized list of a plurality of callers camping on the telephone associated with the campee;
provide the campee access to the prioritized list to allow the campee to set the order of the plurality of callers camping on the telephone associated with the campee;
receive information from the campee indicative of an order of the prioritized list;
monitor the apparent availability of the campee to receive a call by receiving the apparent availability from at least one presence user agent associated with the campee;
monitor the apparent availability of the caller to participate in a call by receiving the apparent availability from at least one presence user agent associated with the caller;
provide an indication to the caller that the campee appears available to receive a call when the caller attains the highest priority in the prioritized list and the campee appears available to receive a call; and
in response to a caller not accepting, within a predetermined amount of time, an indication that the campee appears available to receive a call, automatically making the campee appear unavailable to receive a call and if, based on information received from a presence user agent, the caller appears unavailable, move the caller to a new location in the prioritized list.

32. The computer program of claim 31, wherein the prioritized list is a first in, first out list.

33. The computer program of claim 31, wherein the computer program is further operable to prioritize the prioritized list in response to information provided by the campee.

34. The computer program of claim 31, wherein the computer program is further operable to automatically provide an indication to the caller that the campee appears available only when the caller appears available.

35. The computer program of claim 31, when the computer program is further operable to monitor the availability of the campee to receive a call.

36. The computer program of claim 31, wherein the computer program is further operable to monitor the availability of the plurality of campers to receive a call.

37. A system for facilitating communication comprising:
means for receiving at least one indication associated with respective ones of at least one campee that is indicative of the availability of the campee;
means for storing a prioritized list of a plurality of callers camping on the campee;
a connection means between the prioritized list and the campee allowing the campee to access and set the order of the prioritized list of callers camping on the campee; and
at least one means for generating at least one indication of the availability of at least one of the campers;
means for determining, based on information received from a presence user agent, that the campee is available and the camper having the highest priority is unavailable to receive a call; and
means for storing an update to the prioritized list, the update comprising moving a camper to a new location in the prioritized list when the campee is available and the camper having the highest priority is unavailable to receive the call.

38. The system of claim 37, and further comprising a means operable to prioritize the prioritized list.

39. The system of claim 38, wherein the means operable to prioritize the prioritized list is operable to prioritize the prioritized list in response to the identity of the camper.

40. The system of claim 37, wherein the means operable to prioritize the prioritized list and the prioritized list are stored on one of the means operable to receive at least one indication and off the means operable to receive at least one indication.

41. The system of claim 37, and further comprising a means for generating the at least one indication of the availability of the campee.

42. The system of claim 37, wherein the means for prioritizing the prioritized list is further operable to prioritize the prioritized list in a first in, first out manner.

43. The system of claim 37, wherein the means for prioritizing the prioritized list is further operable to prioritize the prioritized list in response to the information provided by the campee.

44. The system of claim 37, further comprising a means for automatically making the campee appear unavailable to receive a call in response to a caller not accepting an indication that the campee appears available to receive a call.

* * * * *